United States Patent
Clausen et al.

(10) Patent No.: US 9,608,557 B2
(45) Date of Patent: Mar. 28, 2017

(54) METHOD FOR CONTROLLING OPERATION OF AN ELECTRIC MOTOR IN A HEIGHT-ADJUSTABLE FURNITURE ARRANGEMENT

(75) Inventors: Björn Clausen, Laholm (SE); Hans Pettersson, Habo (SE)

(73) Assignee: KIH-UTVECKLING AB, Jonkoping (SE)

( * ) Notice: Subject to any disclaimer, the term of this patent is extended or adjusted under 35 U.S.C. 154(b) by 0 days.

(21) Appl. No.: 13/353,827

(22) Filed: Jan. 19, 2012

(65) Prior Publication Data
US 2012/0181968 A1    Jul. 19, 2012

(30) Foreign Application Priority Data

Jan. 19, 2011   (EP) ..................................... 11151439

(51) Int. Cl.
| | |
|---|---|
| H02P 7/292 | (2016.01) |
| H02P 29/00 | (2016.01) |
| A47B 9/00 | (2006.01) |
| H02P 29/40 | (2016.01) |
| H02P 9/04 | (2006.01) |

(Continued)

(52) U.S. Cl.
CPC ............ *H02P 29/0033* (2013.01); *A47B 9/00* (2013.01); *H02P 29/40* (2016.02); *H02P 2205/03* (2013.01)

(58) Field of Classification Search
USPC ........ 318/434, 466, 803, 504; 388/800, 806, 388/822
See application file for complete search history.

(56) References Cited

U.S. PATENT DOCUMENTS

| | | | | |
|---|---|---|---|---|
| 5,703,410 A | * | 12/1997 | Maekawa ................ | H02P 9/04 123/339.16 |
| 6,253,563 B1 | * | 7/2001 | Ewert .................. | F25B 27/005 62/185 |
| 6,362,586 B1 | * | 3/2002 | Naidu ........................... | 318/432 |

(Continued)

FOREIGN PATENT DOCUMENTS

EP        1079511 A1     2/2001

OTHER PUBLICATIONS

European search report.

*Primary Examiner* — Eduardo Colon Santana
*Assistant Examiner* — Said Bouziane
(74) *Attorney, Agent, or Firm* — Harness, Dickey & Pierce, PLC (57) ABSTRACT

The present invention relates to a method for controlling operation of an electric motor in a height-adjustable furniture arrangement, wherein operation of the electric motor provides a height-adjusting function in the height-adjustable furniture arrangement. The method comprises the steps of providing, by a power supply unit connected to the electric motor, an incoming power comprising an incoming current and an incoming voltage, transforming the incoming current and the incoming voltage to a motor supply current and a motor supply voltage supplied to the electric motor, measuring load on the electric motor, and when the measured load requires a current higher than the incoming current for providing the height-adjusting function, setting the levels of the motor supply current and/or the motor supply voltage such that the motor supply current is higher than the incoming current and the motor supply voltage is lower than the incoming voltage.

8 Claims, 5 Drawing Sheets

(51) Int. Cl.
  *H02P 7/00*    (2016.01)
  *H02P 7/18*    (2006.01)

(56) References Cited

U.S. PATENT DOCUMENTS

| | | | | |
|---|---|---|---|---|
| 6,561,444 | B1* | 5/2003 | Yokomine | B02C 18/0007 |
| | | | | 241/30 |
| 7,090,297 | B2* | 8/2006 | Mohn | A61G 5/14 |
| | | | | 297/330 |
| 7,795,773 | B1* | 9/2010 | Wittig | H02K 1/141 |
| | | | | 310/179 |
| 2002/0030457 | A1* | 3/2002 | Bastholm | H02P 7/03 |
| | | | | 318/434 |
| 2003/0030396 | A1 | 2/2003 | Bastholm et al. | |
| 2004/0021437 | A1* | 2/2004 | Maslov | B60L 8/00 |
| | | | | 318/400.01 |
| 2004/0245961 | A1* | 12/2004 | Ueda | H02M 1/425 |
| | | | | 318/805 |
| 2005/0031468 | A1* | 2/2005 | Kawaguchi | F04B 49/06 |
| | | | | 417/410.1 |
| 2005/0077883 | A1* | 4/2005 | Walters | H02M 3/156 |
| | | | | 323/273 |
| 2005/0082997 | A1* | 4/2005 | Koch | A47B 9/00 |
| | | | | 318/280 |
| 2007/0229011 | A1* | 10/2007 | Knab | H02H 7/0811 |
| | | | | 318/434 |
| 2009/0079375 | A1* | 3/2009 | Suzuki | B62D 5/046 |
| | | | | 318/434 |
| 2009/0096401 | A1* | 4/2009 | Watabe | B25F 5/00 |
| | | | | 318/446 |
| 2009/0185403 | A1* | 7/2009 | Koch | H02P 7/292 |
| | | | | 363/126 |

* cited by examiner

METHOD FOR CONTROLLING OPERATION OF AN ELECTRIC MOTOR IN A HEIGHT-ADJUSTABLE FURNITURE ARRANGEMENT

TECHNICAL FIELD

The present disclosure relates to a method of controlling an electric motor in a height-adjustable furniture arrangement, and such height-adjustable furniture arrangement.

BACKGROUND

A height-adjustable table support may comprise one or more telescopic columns that may be extended or contracted to raise or lower a table top arranged on top of the table support. The table support may further comprise a linear actuator that provides the telescopic movement of the constituent parts of the columns, and an electric motor adapted to drive the linear actuator such that a rotational movement of the electric motor is converted to a linear movement of the linear actuator. Thereby the electric motor provides the height-adjusting function of the height-adjustable table support. The electric motor needs a power supply unit. The power supply unit may be connected to the mains.

Heavy or heavily loaded tables may demand a costly arrangement for powering the electric motor. There is always a need of providing a more cost-effective manufacturing of height-adjustable tables.

Consequently, there is a need for a way of providing power to the electric motor in a height-adjustable table arrangement in a cost-effective way.

SUMMARY

It is an object of the present invention to provide a cost-effective solution for powering an electric motor in a height-adjustable furniture arrangement.

The present invention is based on the knowledge that when a table top is heavy or heavily loaded, a high power is needed from an electric motor to drive a linear actuator such that the table top is moved. On the other hand, when the table top is lighter or more lightly loaded, the same high power is not needed for the electric motor to move the table top. Consequently, the electric motor and the power supply that supplies the electric motor with power need to be dimensioned for heavy or heavily loaded table tops. Thereby, the electric motor and the power supply are, for most use cases, over dimensioned.

According to a first aspect of the invention a method is provided for controlling operation of an electric motor in a height-adjustable furniture arrangement, wherein operation of the electric motor provides a height-adjusting function in the height-adjustable furniture arrangement. The method comprises the steps of providing, by a power supply unit connected to the electric motor, an incoming power comprising an incoming current and an incoming voltage, transforming the incoming current and the incoming voltage to a motor supply current and a motor supply voltage supplied to the electric motor, measuring load on the electric motor, and when the measured load requires a current higher than the incoming current for providing the height-adjusting function, setting the levels of the motor supply current and/or the motor supply voltage such that the motor supply current is higher than the incoming current and the motor supply voltage is lower than the incoming voltage.

By making it possible to set the motor supply current to a value higher than the current from the power supply unit, a higher torque, and thereby a higher lifting force can be achieved for the same type of power supply unit. Consequently, it will be possible to use a smaller and thereby cheaper power supply unit for lifting a table top having a certain load compared to if the power supply unit directly drives the motor. Thereby, a more cost-efficient solution for powering an electric motor in a height adjustable furniture arrangement is achieved. For being able to increase the motor supply current above the incoming current level, the motor supply voltage need to be lowered. Thereby, the part of the adjustable furniture that is to be adjusted, e.g. a table top, is moved slower than it was with a higher motor supply voltage. On the other hand it is possible to lift a heavier table top.

When the electric motor has a high load, the motor supply current and motor supply voltage may be set to increase the torque and lifting force in the electric motor. The electric motor may operate efficiently with a high load when reaching a maximum torque. By doing so, the available power may be efficiently utilized to handle such high load. When the load on the electric motor increases, the electric motor may need a larger motor supply current to keep operating at a high, or maximum, torque. When the motor supply current is increased, the motor supply voltage may need to be decreased such that the maximum available power level is not exceeded. When the motor supply voltage is decreased, the speed of electric motor may decrease. When the speed of the electric motor decreases, the speed of the height-adjustment of the furniture may decrease. The motor supply current and the motor supply voltage may be increased and decreased such that the maximum available power is efficiently utilized.

In one embodiment, the step of measuring the load on the electric motor may be realized by measuring the motor supply current level that the motor demands for providing the height-adjusting function, and wherein the step of setting may be realized by calculating a motor supply voltage level necessary for achieving the measured motor supply current level and setting the motor supply voltage to the calculated motor supply voltage level.

By measuring the load on the electric motor, any change in the current need for the electric motor may be detected. The motor supply voltage may be set as a response to the detected load on the electric motor. By setting the motor supply voltage as a response to the detected load on the electric motor, one may avoid that the maximum available power level is exceeded.

In a further embodiment, the step of setting the motor supply voltage may comprise comparing the calculated motor supply voltage level to a predetermined minimum motor supply voltage level, and only setting the motor supply voltage to the calculated level if the calculated level is above the predetermined minimum level.

The predetermined minimum motor supply voltage level may correspond to a minimum voltage level needed for the electric motor to operate. By using the predetermined minimum motor supply voltage level, it may be avoided that the motor supply voltage is set to a level that is too low for the electric motor to operate. A too low motor supply voltage may provide a too slow motor operation, which may not be useful for the user, or which may damage the electric motor.

In another embodiment, the levels of the motor supply current and the motor supply voltage may be set such that the incoming power is not exceeded.

By making sure that the incoming power, i.e. the maximum available power level, is not exceeded, the incoming power from the power supply unit may be utilized in an efficient way.

In one embodiment, the method may further comprise the steps of measuring the incoming current and the incoming voltage, and calculating the incoming power based on the measured incoming current and incoming voltage provided by the power supply unit.

Since the incoming current and the incoming voltage from the power supply unit may vary, it is advantageous to measure these values to be able to use values of the motor supply current and motor supply voltage that matches the currently available electrical power from the power supply unit. The currently available electrical power may be the maximum available power level. A capacitance may further be used for evening the incoming voltage provided by the power supply unit.

In another embodiment, the motor supply voltage and the motor supply current may be provided to the motor as a pulse width modulation signal, and wherein the motor supply voltage level may be set by varying the width of the pulse width modulation signal.

By varying the width of a pulse width modulation signal it may be possible to easily adapt the motor supply voltage to a requested level. The controlling of the pulse width modulation signal enables the motor supply current to be larger than the incoming current. An inductance in the electric motor may be used for providing the electric motor with a more even current from the pulse width modulation signal. Alternatively, a resistive load may be used for increasing the motor supply current. The frequency of the pulses in the pulse width modulation signal may be higher than the frequencies in the hearable range of the human ear, thereby not providing an annoying sound for a user.

In yet another embodiment, the motor supply current and the motor supply voltage, in a first state when the measured load requires a motor supply current level that may be lower than the incoming current, provide a power to the electric motor that may be less than the incoming power level, and in a second state, when the measured load requires a motor supply current level that may be equal to or higher than the incoming current, provide a power to the electric motor that may be substantially equal to the incoming power level.

Thereby, when the maximum available power level is reached, an increased load on the electric motor may result in that the levels of the motor supply current and the motor supply voltage may be set such that the torque in the electric motor is maximized, without exceeding the maximum available power level.

According to a second aspect of the invention, a height-adjustable furniture arrangement is provided comprising a power supply unit providing an incoming current and an incoming voltage, which incoming current and incoming voltage set a incoming power level for the height-adjustable furniture arrangement, at least one electric motor adapted to provide a height-adjusting function in the height-adjustable furniture arrangement, and a control device adapted to receive the incoming current and the incoming voltage from the power supply unit, and to transform the incoming current to a motor supply current and the incoming voltage to a motor supply voltage, wherein the motor supply current and motor supply voltage are supplied to the at least one electric motor. The control device is adapted to measure load on the electric motor, and when the measured load requires a motor supply current higher than the incoming current for providing the height-adjusting function, setting the levels of the motor supply current and/or the motor supply voltage such that the motor supply current is higher than the incoming current and the motor supply voltage is lower than the incoming voltage.

When the load on the electric motor increases, the electric motor may need a larger motor supply current to keep operating at a high, or maximum, torque. The motor supply current may then be set such that it is higher than the incoming current. When the motor supply current is increased, the motor supply voltage may need to be decreased such that the maximum available power level is not exceeded. With a motor supply current that may be larger than the incoming current a larger lifting force may be provided by the electric motor. When the motor supply voltage is decreased, the speed of electric motor may decrease. When the speed of the electric motor decreases, the speed of the height-adjustment of the furniture may decrease. The motor supply current and the motor supply voltage may be increased and decreased such that all the maximum available power is always utilized. A power supply unit of less power capacity may thereby be used compared to prior art solutions. With a low capacity power supply, a cost-effective height-adjustable furniture arrangement may be achieved.

In one embodiment, the control device may be adapted to set the motor supply current and the motor supply voltage such that the incoming power level is not exceeded.

The maximum available power level may not be exceeded. However, the levels of the motor supply current and the motor supply voltage may be set by the controlling device such that the motor supply power (motor supply current*motor supply voltage) never exceeds the maximum available power level from the power supply unit, but the distribution between the motor supply current and the motor supply voltage may be changed. Thereby, when the maximum available power level first is reached, the controlling device may distribute the current and voltage to the electric motor such that the electric motor may be operated with an even larger load, providing a high torque in the electric motor. To make this very high load operation available, the motor supply voltage may be decreased.

According to a third aspect of the invention, a height-adjustable furniture arrangement is provided comprising a power supply unit providing an incoming current and an incoming voltage, which incoming current and incoming voltage set an incoming power level for the height-adjustable furniture arrangement, at least one electric motor adapted to provide a height-adjusting function in the height-adjustable furniture arrangement, and a control device adapted to receive the incoming current and the incoming voltage from the power supply unit, and to supply a motor supply current and motor supply voltage to the at least one electric motor. The control device further comprises a transformation unit for transforming the incoming current and the incoming voltage to the motor supply current and the motor supply voltage supplied to the electric motor, a measuring unit for measuring load on the electric motor, and a regulator unit arranged for, when the measured load requires a motor supply current higher than the incoming current for providing the height-adjusting function, setting the levels of the motor supply current and/or the motor supply voltage such that the motor supply current is higher than the incoming current and the motor supply voltage is lower than the incoming voltage, the regulator unit further being arranged for providing the set values for the motor supply voltage and the motor supply current to the transformation unit.

All the electronic circuits may be provided in the controlling device. The controlling device may be connected to the power supply unit and to the electric motor. Thereby, the incoming current and voltage from the power supply unit may be transformed by the controlling device to current and voltage for the electric motor.

BRIEF DESCRIPTION OF THE DRAWINGS

The invention will in the following be described in more detail with reference to the enclosed drawings, wherein.

DESCRIPTION OF EMBODIMENTS

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Figure 1:
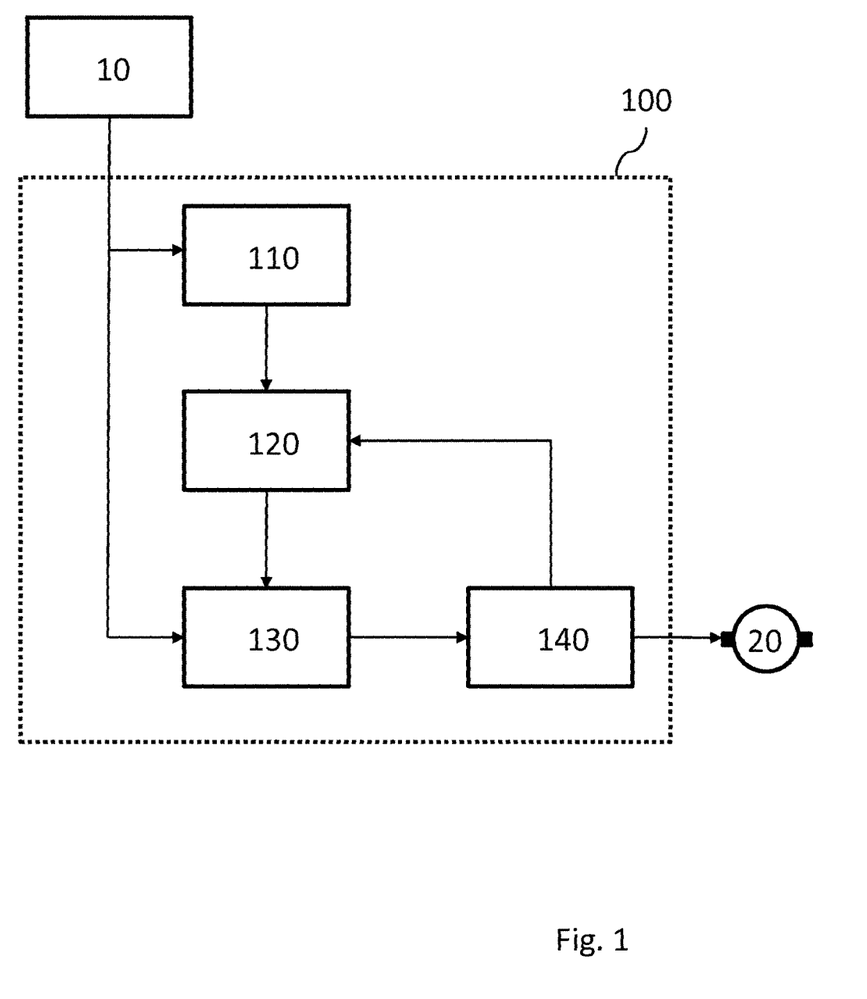
FIG. 1 illustrates a schematic block scheme of a control device according to an embodiment of the invention.

FIG. 1 illustrates a schematic block scheme of a height-adjustable furniture arrangement comprising a control device 100, a power supply unit 10 and an electric motor 20. The power supply unit 10 provides power to the electric motor 20 via the control device 100. The control device 100 comprises a calculation unit 110 that detects an incoming current and an incoming voltage from the power supply unit 10. The calculation unit 110 calculates a maximum available power level based on the incoming current and the incoming voltage. The calculated maximum available power level is provided to a regulator unit 120.

The control device 100 further comprises a transformation unit 130 that receives the incoming current and the incoming voltage from the power supply unit 10. The transformation unit 130 transforms the incoming voltage and incoming current to a motor current and a motor voltage and supplies the motor current and motor voltage to the electric motor 20 via a measuring unit 140. The measuring unit 140 measures the motor current level and possibly also the motor voltage level supplied by the transformation unit 130. The measured values provide information about the load on the electric motor 20. Especially, the motor current level may be a measure of the load on the electric motor 20. The levels measured by the measuring unit 140 are fed back to the regulator unit 120. The regulator unit 120 calculates a necessary motor current level and motor voltage level based on the calculated maximum available power level, received from the calculation unit 110, and on the measured load on the electric motor 20, received from the measuring unit 140. The regulator unit 120 provides the calculated motor current level and motor voltage level to the transformation unit 130 that controls the levels of the motor current and the motor voltage based on the received information from the regulator unit 120 by transforming the incoming current and incoming voltage to the calculated motor current level and calculated motor current voltage. The transformation unit 130 controls the motor current and the motor voltage such that the maximum available power level is not exceeded.

At high load on the electric motor 20, the motor current is increased. When the measured load requires a motor current higher than the incoming current for providing the height-adjusting function, the levels of the motor supply current and the motor supply voltage is set by the regulator unit 120 such that the motor supply current becomes higher than the incoming current and the motor supply voltage becomes lower than the incoming voltage.

Thereby, a high torque and, consequently, a high lifting force are achieved by the electric motor 20, such that the electric motor 20 manages to raise the part of the height-adjustable furniture that is to be raised. The achieved torque, and lifting force is then higher than the lifting force achieved if the power supply unit is connected directly to the motor. For example, if the incoming voltage is 30 V and the incoming current is 5 A, and the load on the motor needs 6 A, the control device 100 increases the motor current to 6 A and decreases the motor voltage to 25 V.

Although, since the speed of an electric motor is proportional to the motor voltage, the speed of the motor, and consequently, the speed of the piece of the height-adjustable furniture that is to be moved will move more slowly when the motor current increases and the motor voltage decreases.

Figure 2:
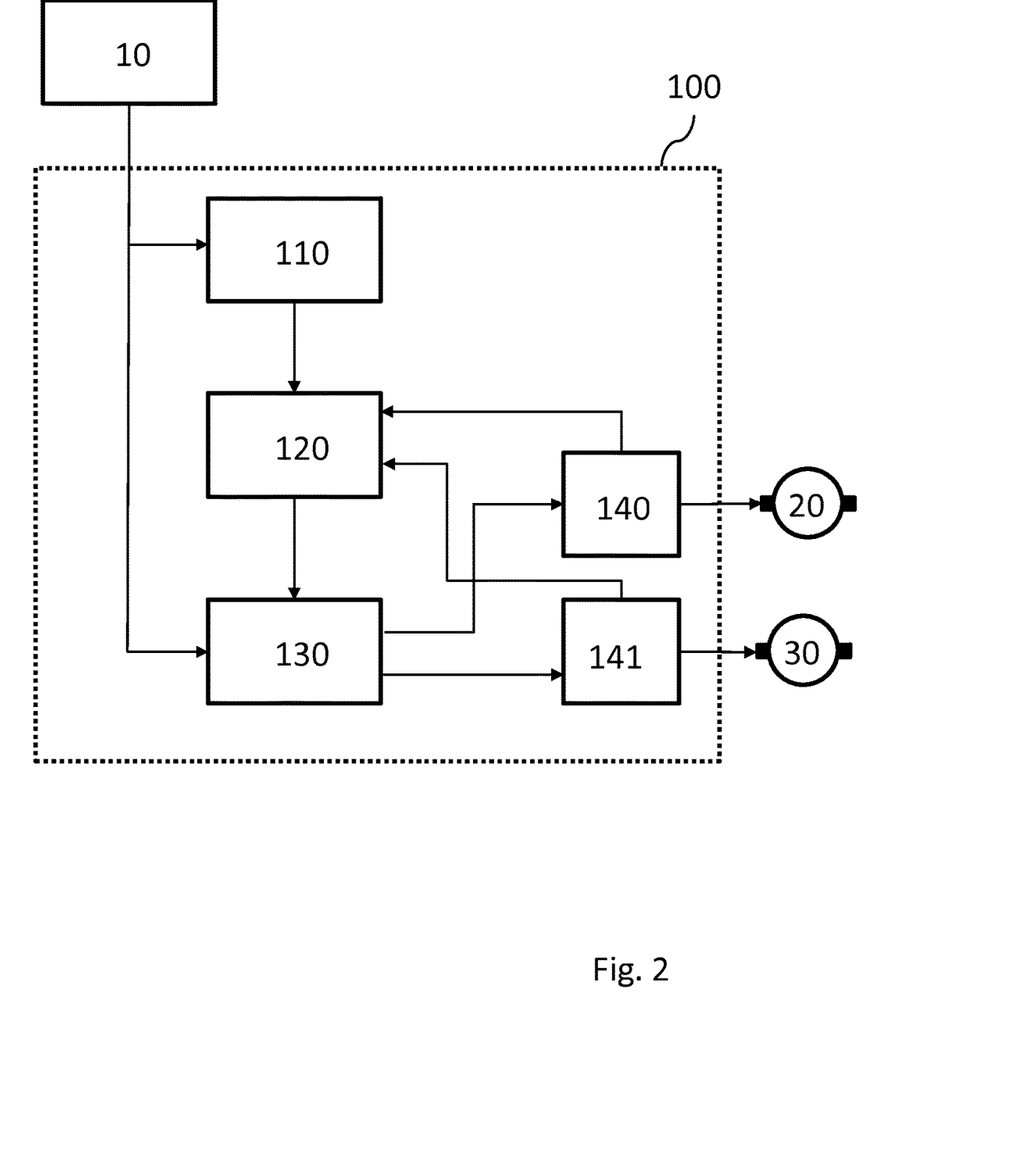
FIG. 2 illustrates a schematic block scheme of a control device according to an embodiment of the invention.

FIG. 2 illustrates an alternative embodiment of the invention wherein the control device 100 supplies motor current and motor voltage to two electric motors 20, 30. The current and voltage to the first electric motor 20 is measured by the first measuring unit 140, and the current and voltage to the second electric motor 30 is measured by a second measuring unit 141. The measured values from both measuring units 140, 141 are provided to the regulator unit 120. The control of the motor currents and motor voltages to the electric motors 20, 30 by the transformation unit 130 is based on the measured values from the measuring units 140, 141 and the calculated maximum available power level.

As an example, the power supply unit may provide power such that the maximum available power level calculated by the calculating unit 110 is 150 W, delivered as a current of 5 A and a voltage of 30 V. A heavily loaded table top may be raised by the electric motors 20, 30 providing a need in each motor of 6 A to reach a maximum torque. The maximum torque may be needed for the electric motors 20, 30 to be able to raise the table top. 6 A for each electric motor 20, 30 results in a total of 12 A. This total current is larger than the incoming current of 5 A. The transformation unit may then lower the motor voltage to each electric motor 20, 30 to 12.5 V. Thereby, the total power used by the electric motors 20, 30 is 2*6*12.5=150 W. In that way a power supply unit only providing 5 A may be used as power supply for two electric motors even during high load on the electric motors 20, 30 demanding a total current higher than 5 A.

In one embodiment, if the table top is unevenly loaded, the load on the first electric motor 20 may differ from the load on the second electric motor 30. If the load on the first electric motor 20 is higher than the load on the second electric motor 30, the first electric motor 20 will be provided with a larger motor current than the second electric motor 30. In some cases the first electric motor 20 may receive a substantially major part of the motor currents provided to the two electric motors 20, 30. The motor voltages to the two electric motors 20, 30 may be set such that the electric motors 20, 30 still operate with the same speed, even that the first electric motor 20 receives more motor current than the second electric motor 30. The total power provided to the two electric motors 20, 30 will still not exceed the maximum available power level.

Figure 3:
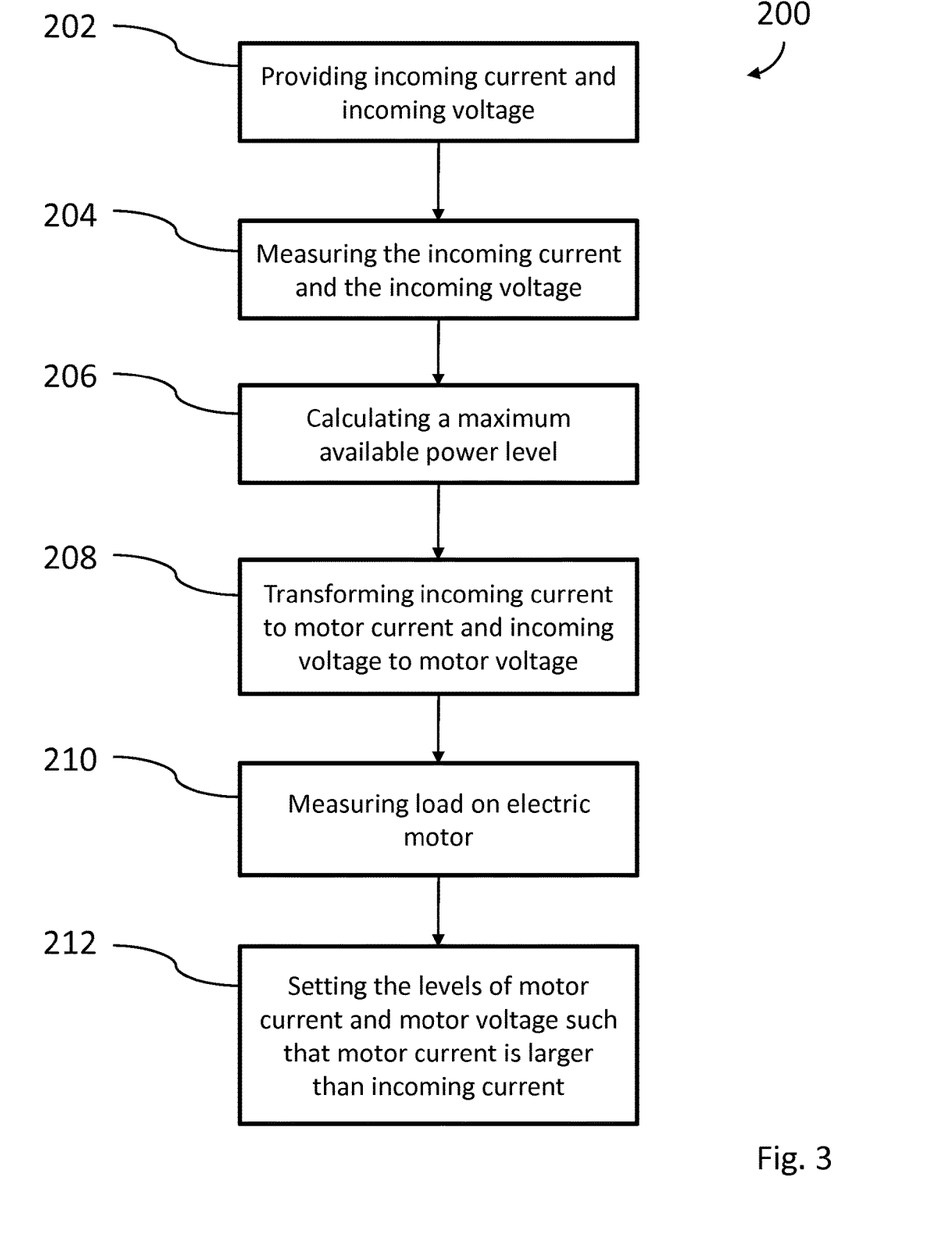
FIG. 3 illustrates a schematic flow chart of a method according to an embodiment of the invention.

FIG. 3 illustrates a flow chart of a method 200 of controlling the electric motor 20. The step 202 comprises providing the incoming current and the incoming voltage. The incoming current and incoming voltage is provided by the power supply unit. The next step 204 comprises measuring the incoming current and the incoming voltage. Since the incoming current and voltage may vary over time, they may be measured to establish the present values. The step 206 includes calculating the maximum available power level, based on the measured incoming current and incoming voltage. Thereby, the present incoming power is calculated, and establishes the power available for the electric motor 20. The steps 204 and 206 are optional.

The step 208 comprises transforming the incoming current to a motor current and the incoming voltage to a motor voltage. The motor current and the motor voltage are adapted for powering the electric motor 20. The step 210 includes measuring the load on the electric motor 20. The measured load value is fed back to the regulator that performs the step 212 of setting the levels of the motor current and the motor voltage such that the motor current may be larger than the incoming current. This method 200 enables an effective utilization of the available power from the power supply unit. The torque in the electric motor 20 may be raised to a high level without exceeding the maximum available power level from the power supply unit.

Figure 4:
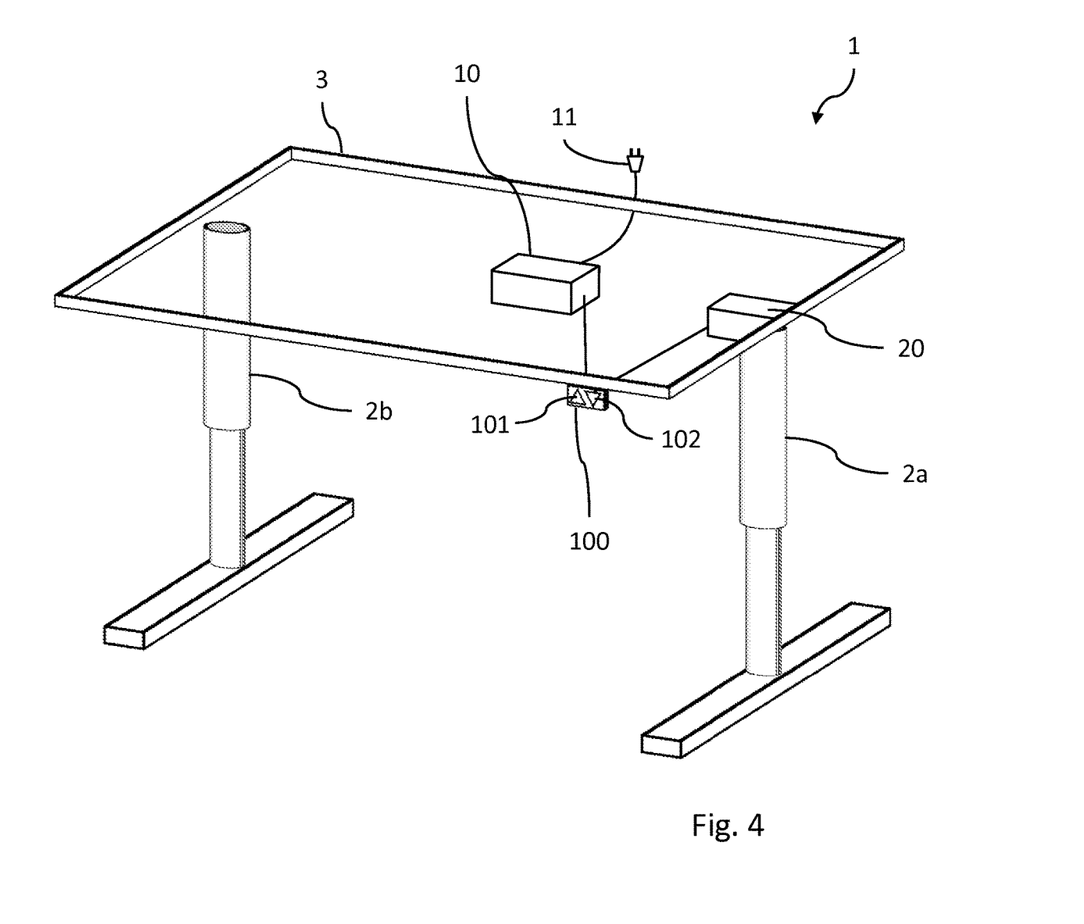
FIG. 4 illustrates a perspective view of a height-adjustable table arrangement according to an embodiment of the invention.

FIG. 4 illustrates a height-adjustable table 1 comprising an electric motor 20 adapted to drive a linear actuator (not shown) in a first telescopic column 2a to adjust the height of a table top 3. A linear actuator in a second telescopic column 2b may be driven by the same electric motor via a mechanical transmission (not shown). The table 1 further comprises a power supply unit 10 that is adapted to be connected to the mains via a power connector 11. The power supply unit 10 is connected to the mains via a power socket 11. The power supply unit 10 comprises a transformer for transforming the mains voltage to a voltage suitable for the height-adjustable furniture arrangement 1. The power supply unit 10 further comprises a rectifying unit for converting the incoming alternating current (AC) from the mains to direct current (DC) suitable for the height-adjustable furniture arrangement 1.

The transformed voltage and DC current are provided to the control device 100. The power supply unit 10 is connected to a control device 100. The control device 100 is provided with two buttons 101, 102 for controlling the operation of the electric motor 20. One button 101 is operated for raising the table top 3, and the other button 102 is operated for lowering the table top 3. The control device 100 is connected to the electric motor 20 for supplying a motor current and a motor voltage to the electric motor 20.

Figure 5:
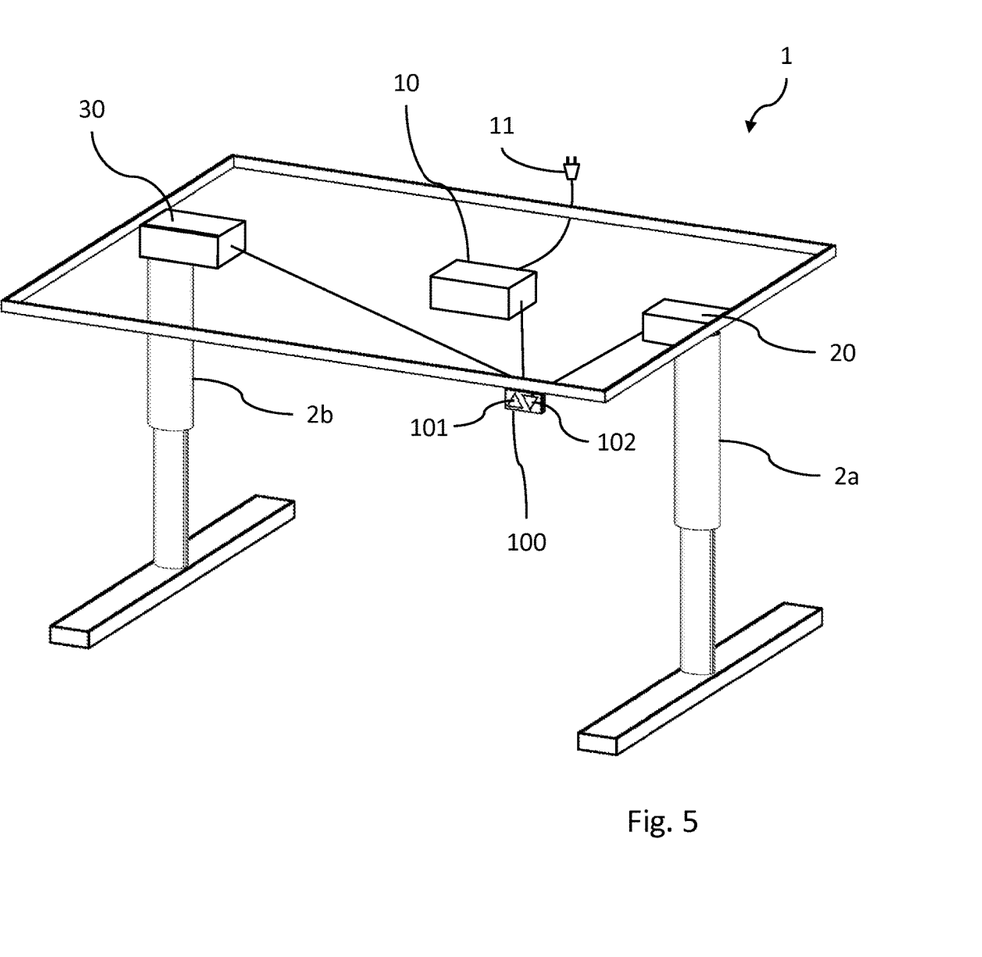
FIG. 5 illustrates a perspective view of a height-adjustable table arrangement according to an embodiment of the invention.

FIG. 5 illustrates a height-adjustable table 1 having two electric motors, a first electric motor adapted to control a linear actuator (not shown) in the first telescopic column 2a and a second electric motor 30 adapted to control a linear actuator (not shown) in the second telescopic column 2b. Both electric motors 20, 30 are connected to the control device 100 which supplies motor current and motor voltage to the two electric motors 20, 30.

In an embodiment, all electronic circuits for the power control of the electric motor 20 is arranged in the control device 100. By providing all electronic circuits for power control of the table support in the control device 100, instead of having power control electronics in the power supply unit, a standard power supply unit 10 may be used. A standard power supply unit 100 may provide a more cost-effective manufacturing of the height-adjustable furniture arrangement 1, compared to specially adapted power supply units comprising control electronics for the table support. The standard power supply 10 is connected to the control device 100 for providing the incoming power to the control device 100. The control device 100 may be adaptable for receiving incoming powers if different levels, i.e. the control device 100 may be adaptable for functioning with power supply units of different sizes. For instance, the control device 100 may be programmed for a certain power supply unit size. Thereby, the height-adjusting function in the height-adjustable furniture arrangement 1 may depend on the power supply unit that is used, and how the control device 100 is programmed.

A power control system for powering an electric motor in a height-adjustable furniture arrangement is provided, wherein the system comprises a power supply unit, and a control device, wherein the power supply unit is adapted to provide an incoming power for the electric motor via the control device, and wherein the control device comprises all power control circuits for controlling the power to the electric motor. Thereby, the power supply unit only comprises parts for delivering a DC power for the electric motor, and the control device comprises all circuits necessary for controlling the power to the electric motor. This provides the possibility of using a standard power supply unit which may result in a cost-effective arrangement.

A power control system for powering an electric motor in a height-adjustable furniture arrangement is provided, wherein the system comprises a power supply unit, and a control device, wherein the power supply is connected to the control device and wherein the power supply unit is adapted to provide an incoming power for the electric motor via the control device, and wherein the control device comprises power control arrangements for controlling the power to the electric motor, and wherein the power supply unit is arranged for delivering a predetermined current and voltage and has no power control arrangement for controlling the power to the electric motor.

The power supply unit may in one embodiment comprise a transformer and a rectifying unit. The power supply unit may further be adapted to be connected to the mains. The control device may be adapted to supply a motor supply current and a motor supply voltage to the electric motor, and to control the levels of the motor supply current and the motor supply voltage.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A method for controlling operation of a direct current (DC) electric motor in a height-adjustable furniture arrangement, the DC electric motor being configured to provide a height-adjusting function to adjust a height of at least a portion of the height-adjustable furniture arrangement, the method comprising;

providing, by a power supply unit connected to the DC electric motor, an incoming power comprising an incoming current and an incoming voltage connected to a transformation unit;

measuring, by a control device, the incoming current and the incoming voltage, the control device including a regulator unit, a transformation unit, a measuring unit, and a second measuring unit;

transforming, at the transformation unit, the incoming current and the incoming voltage to a motor supply current and a motor supply voltage to be supplied to the DC electric motor, measuring, at the measuring unit, a load on the DC electric motor, and transforming, by the control device, when the measured load requires a motor supply current higher than the measured incoming current for providing the height-adjusting function, the levels of the motor supply current and the motor supply voltage supplied to the DC electric motor to cause the DC electric motor to adjust the height of the portion of the height-adjustable furniture arrangement such that the motor supply current is higher than the measured incoming current, the motor supply voltage is lower than the measured incoming voltage, and the incoming power is not exceeded, wherein, the measuring the load measures a motor supply current level, the measured motor supply current level being a current level that provides the height-adjusting function for the load, and the transforming includes,
calculating, by the regulator unit, a motor supply voltage level, the calculated motor supply voltage level being a voltage level that achieves the measured motor supply current level and that achieves a desired torque for the measured load, and
transforming the motor supply voltage to the calculated motor supply voltage level such that the DC electric motor operates to adjust the height of the portion of the height-adjustable furniture arrangement according to the transformed motor supply voltage.

2. The method according to claim 1, wherein the transforming the motor supply voltage comprises comparing, by the regulator unit, the calculated motor supply voltage level to a predetermined minimum motor supply voltage level, and transforming the motor supply voltage to the calculated level if the calculated level is above the predetermined minimum level.

3. The method according claim 1, further comprising:
calculating, by a calculation unit of the control device, the incoming power based on the measured incoming current and the measured incoming voltage provided by the power supply unit.

4. The method according to claim 1, further comprising:
applying the motor supply voltage and the motor supply current to the motor as a pulse width modulation signal, wherein the transforming the motor supply voltage level includes varying a width of the pulse width modulation signal.

5. The method according to claim 1, wherein the motor supply current and the motor supply voltage are associated with at least first and second power states, the first power state providing a power to the DC electric motor that is less than the incoming power level when the measured load requires a motor supply current level that is lower than the measured incoming current, the second power state providing a power to the DC electric motor that is substantially equal to the incoming power level when the measured load requires a motor supply current level that is equal to or higher than the measured incoming current.

6. The method according to claim 1, wherein the measuring the load by the measuring unit occurs throughout the operation of the DC electric motor.

7. A height-adjustable furniture arrangement, comprising:
a power supply unit configured to provide an incoming current and an incoming voltage, the incoming current and incoming voltage setting an incoming power level for the height-adjustable furniture arrangement;
at least one direct current (DC) electric motor configured to adjust a height of at least a portion of the height-adjustable furniture arrangement; and
a control device including a regulator unit, a transformation unit, a first measuring unit, and a second measuring unit;
the control device configured to,
receive the incoming current and the incoming voltage from the power supply unit,
measure the incoming current and the incoming voltage, and
transform, at the transformation unit, the incoming current to a motor supply current and the incoming voltage to a motor supply voltage, wherein the motor supply current and motor supply voltage being suppliable to the at least one DC electric motor,
the control device further configured to,
measure, at the first measuring unit, a load on the DC electric motor,
measure, at the second measuring unit, a motor supply current level, the measured motor supply current level being a current level that provides the height-adjusting function for the load,
transform, at the transformation unit, when the measured load requires a motor supply current higher than the measured incoming current for providing the height-adjusting function, the levels of the motor supply current and the motor supply voltage supplied to the DC electric motor to cause the DC electric motor to adjust the height of the portion of the height-adjustable furniture arrangement such that the motor supply current is higher than the measured incoming current, the motor supply voltage is lower than the measured incoming voltage, and the incoming power is not exceeded,
calculate, at the regulator unit, a motor supply voltage level, the calculated motor supply voltage level being a voltage level that achieves the measured motor supply current level and that achieves a desired torque for the measured load, and
transform the motor supply voltage to the calculated motor supply voltage level such that the DC electric motor operates to adjust the height of the portion of the height-adjustable furniture arrangement according to the transformed motor supply voltage.

8. A height-adjustable furniture arrangement, comprising:
a power supply unit configured to provide an incoming current and an incoming voltage, the incoming current and incoming voltage setting an incoming power level for the height-adjustable furniture arrangement;
at least one direct current (DC) electric motor configured to adjust a height of at least a portion of the height-adjustable furniture arrangement; and
a control device configured to receive the incoming current and the incoming voltage from the power supply unit, to measure the incoming current and the incoming voltage, and to supply a motor supply current and motor supply voltage to the at least one DC electric motor to cause the DC electric motor to adjust the height of the portion of the height-adjustable furniture arrangement, wherein the control device includes,
- a transformation unit configured to transform the incoming current and the incoming voltage to the motor supply current and the motor supply voltage to be supplied to the DC electric motor,
- a measuring unit configured to measure a load on the DC electric motor, and to measure a motor supply current level, the measured motor supply current level being a current level that provides the height-adjusting function for the load, and
- a regulator unit configured to,
  - set, when the measured load requires a motor supply current higher than the measured incoming current for providing the height-adjusting function, the levels of the motor supply current and the motor supply voltage such that the motor supply current is higher than the measured incoming current, the motor supply voltage is lower than the measured incoming voltage, and the incoming power is not exceeded,
  - provide the set levels for the motor supply voltage and the motor supply current to the transformation unit,
  - calculate a motor supply voltage level, the calculated motor supply voltage level being a voltage level that achieves the measured motor supply current level and that achieves a desired torque for the measured load, and
  - transform the motor supply voltage to the calculated motor supply voltage level such that the DC electric motor operates to adjust the height of the portion of the height-adjustable furniture arrangement according to the transformed motor supply voltage.

* * * * *